United States Patent [19]

Fischer et al.

[11] Patent Number: 4,534,724
[45] Date of Patent: Aug. 13, 1985

[54] APPARATUS FOR PRODUCING PROFILED STRANDS

[75] Inventors: Rolf Fischer, Hanover; Dietmar Hermann, Garbsen, both of Fed. Rep. of Germany

[73] Assignee: Continental Gummi-Werke Aktiengesellschaft, Hanover, Fed. Rep. of Germany

[21] Appl. No.: 510,366

[22] Filed: Jul. 1, 1983

[30] Foreign Application Priority Data

Jul. 3, 1982 [DE] Fed. Rep. of Germany ....... 3224906

[51] Int. Cl.³ ............................................. B29C 17/14
[52] U.S. Cl. ..................................... 425/295; 264/37;
264/145; 264/167; 264/177 R; 425/217;
425/298; 425/311; 425/315; 425/325
[58] Field of Search ................... 264/145, 148, 177 R,
264/146, 167, DIG. 69, DIG. 37; 425/295, 298,
311, 315, 142, 217, 325

[56] References Cited

U.S. PATENT DOCUMENTS

| 12,685 | 8/1907 | Reynolds | 264/146 |
| 811,793 | 2/1906 | Reynolds | 264/146 |
| 2,446,493 | 8/1948 | Silvia et al. | 264/146 |
| 3,093,443 | 6/1963 | Levinson | 264/37 |
| 3,555,137 | 1/1971 | Carmody | 264/148 |
| 3,723,582 | 3/1973 | Winstead | 264/37 |
| 4,009,237 | 2/1977 | Kimura et al. | 264/167 |
| 4,272,472 | 6/1981 | Hulin et al. | 264/146 |

FOREIGN PATENT DOCUMENTS

| 240068 | 8/1960 | Australia | 264/177 R |
| 1179358 | 10/1964 | Fed. Rep. of Germany | |
| 2527125 | 12/1976 | Fed. Rep. of Germany | 264/148 |
| 2617123 | 10/1977 | Fed. Rep. of Germany | 264/167 |
| 2812591 | 9/1978 | Fed. Rep. of Germany | 264/148 |
| 46-18630 | 5/1971 | Japan | 264/177 R |

Primary Examiner—Jeffery Thurlow
Attorney, Agent, or Firm—Becker & Becker, Inc.

[57] ABSTRACT

A sealing profiled strand of elastomeric materials provided with sealing lips along portions of the strand. The strands emerge from the nozzle or orifice of the extruder, at which point they still have a complete cross section. While still in the plastic state, the strands are cut by a transversely movable cutting knife which is curved in conformity to the outer contour of the strand. The strand is cut pursuant to a prescribed pattern in such a way as to remove portions of the sealing lip.

1 Claim, 1 Drawing Figure

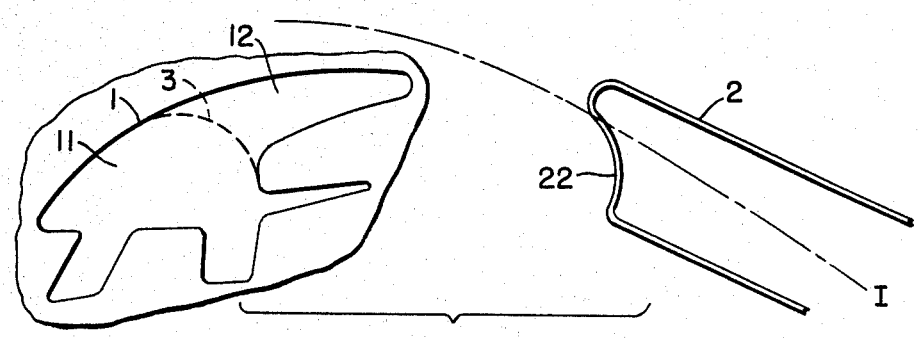

APPARATUS FOR PRODUCING PROFILED STRANDS

BACKGROUND OF THE INVENTION

The present invention relates to a method of producing extrusions of profiled strands from elastomeric materials with sealing lips along portions of its curved outer contour. The present invention also relates to an apparatus for carrying out such a method.

Profiled strands which are used, for example, for framing and binding window panes of vehicles and buildings, are generally produced in practically infinite lengths using the elastomeric material mixture, which is predominantly in the plastic state, extruded but of an appropriately shaped nozzle or orifice. A particular difficulty ensues from the variously raised requirement for the removal of partial sections of the sealing lips which are uniformly formed on the profiled strand. The subsequent mechanical cutting of the already produced profiled strands is time consuming and uneconomical, and has the additional drawback that unusable, polymerized elastomeric material is obtained. German Pat. No. 1179358 discloses cutting out sections of, extruded profiled strips by means of a power-operated cutting tool using a given pattern immediately after they emerge from the orifice of the extruder. However, since the known apparatus, without regard to the cross sectional shape of the profiled strands and their final shape, which is determined by the peculiarities of the respectively prevailing mounting conditions, is always only set for a linear cutting guidance as well as for the formation of linearly extending cutting edges.

It is therefore an object of the present invention to produce extruded profiled strands which can be used for framing and sealing purposes, and which are alternately provided with uniformly formed-on and eliminated sealing lips; in this connection, the transitions between the various sections are to be formed in precise conformity to the arcuate curved outer contours of the strands.

BRIEF DESCRIPTION OF THE DRAWING

This object, and other objects and advantages of the present invention, will appear more clearly from the following specification in conjunction with the accompanying drawing, which is a very simplified illustration diagrammatically showing the configuration of one embodiment of the apparatus of the present invention.

SUMMARY OF THE INVENTION

The method of the present invention is characterized primarily in that the strands are first produced with a continuous cross section which is augmented by the sealing lips, and that subsequently, in the still predominantly plastic state of the elastomeric material, sections of the sealing lips are mechanically cut off.

An apparatus suitable for carrying out this method expediently contains an extruder having a cutting knife which is arranged ahead of the nozzle of orifice of the extruder and is movable transverse to the longitudinal direction of the profiled strands. Pursuant to an important feature of the invention, this apparatus is characterized primarily in that the cutting knife, which can be advanced over the cross section of the cutting lips, has a curved shape which conforms to the adjacent outer contour of the profiled strands.

Pursuant to a further embodiment of the present invention, the cutting knife can be formed from a high-strength metal band which is drawn back into itself over a curvature which conforms to the outer contour of the profiled strands.

The present invention makes it possible to continuously extrude profiled strands which are selectively provided over certain portions thereof with and without sealing lips. Beyond the mere cutting-out of sections of the cross section of the strand, in so doing, there can be maintained in all regions, not only of the sections which are free of sealing lips but also of the transition zones, a contour-satisfactory cutting guidance in conformity with the complete original cross section, so that the final result of the ready-to-use profiled strands corresponds to all of the prescribed requirements. The produced cut material is in each case still unpolymerized and can be supplied again immediately for reprocessing. The simple configuration of the cutting knife moreover permits a simple and precise adaptation to every desired profiled strand contour.

DESCRIPTION OF A PREFERRED EMBODIMENT

Referring now to the drawing in detail, the left portion is a plan view of the opening 1 in the nozzle or orifice of an extruder, and the right part shows a cutting knife 2 which can be pivoted in the transverse direction in front of the nozzle. The nozzle opening 1 is formed by a portion 11, which forms the profiled strand itself, and by a portion 12 which is connected to the portion 11 and forms a sealing lip. Normally, the extruded profiled strands have a larger cross-sectional area which corresponds to the two portions 11, 12. However, the present invention makes it possible, by pivoting the cutting knife 2 over the curved line I up to the limiting line 3 which is indicated by a dashed line, to cut off the cross-sectional portion which emerges from the sealing lip portion 12, and to return this portion to the inlet of the extruder.

The cutting knife 2 is formed via a relatively narrow steel band in the shape of an open curved piece of metal in such a way that its leading edge 22 conforms to the shape of the curved limiting line 3 between the two cross-sectional portions 11, 12 of the nozzle opening 1. The cutting edge on the finished profiled strands in all longitudinal regions consequently exhibits complete agreement with the curved base contour.

The present invention is, of course, in no way restricted to the specific disclosure of the specification and drawing, but also encompasses any modifications within the scope of the appended claims.

What we claim is:

1. An apparatus for producing, with an extruder having an inlet and a nozzle opening, a profiled strand which is made of elastomeric material, said strand produced in practically infinite lengths having a curved outer contour and being provided with sealing lips along some of the portions of the curved outer contour thereof; said apparatus including in combination therewith a cutting knife which is arranged after said nozzle opening when viewed in the direction of extrusion, said cutting knife being movable transverse to the longitudinal direction of said profiled strand such that said cutting knife also can be advanced over the cross section of said sealing lips; said cutting knife having a curved shape which conforms to the adjacent outer contour of said profiled strand which is cut by said cutting knife pursuant to a prescribed pattern in such a way as to vary cross-sectional shape and to remove portions of the sealing lip from the profiled strand while the elastomeric material is still predominantly unpolymerized in the plastic state for reprocessing thereof, said cutting knife being formed by a relatively narrow high-strength metal band of steel drawn back and bent into itself over a curvature which conforms to the outer contour of said profiled strand still predominantly unpolymerized to avoid drawbacks of time-consuming and uneconomical mechanical cutting of unusable polymerized elastomeric material, said cutting knife being pivotable over a curved line up to a limiting line to cut off a cross-sectional portion that emerges from the sealing lip and means to return this cut-off cross-sectional portion to the inlet of the extruder for reprocessing of the elastomeric material which is still predominantly unpolymerized in the plastic state.

* * * * *